_United States Patent_ [19]
Zimmermann et al.

[11] 3,786,513
[45] Jan. 15, 1974

[54] RECORDING APPARATUS FOR RECORDING ON A PLURALITY OF TRACKS

[75] Inventors: Hans Zimmermann, Schwenningen; Eduard Schuh, Villingen; Heinz Kelch, Buchenberg; Norbert Helmschrott, Schwenningen, all of Germany

[73] Assignee: Kienzel Apparate, Villengen, Black Forest, Germany

[22] Filed: Feb. 22, 1973

[21] Appl. No.: 334,941

[30] Foreign Application Priority Data
Feb. 24, 1972 Germany.................. P 22 08 714.5

[52] U.S. Cl...................... 346/62, 346/63, 346/64, 346/7
[51] Int. Cl............................ G01d 9/28, G01d 9/36
[58] Field of Search ...................... 346/62, 63, 64, 7

[56] References Cited
UNITED STATES PATENTS
3,683,399 8/1972 Rock........................................ 346/7
3,383,696 5/1968 Fichter.................................... 346/7
3,000,687 9/1961 Haupt..................................... 346/64
3,521,291 7/1970 Helmschrott et al. ................. 346/7

Primary Examiner—Richard B. Wilkinson
Assistant Examiner—Vit W. Miska
Attorney—Michael S. Striker

[57] ABSTRACT

In an apparatus for recording lines on a movable record carrier, a biased recording pin, whose point is urged into contact with the record carrier, is mounted in two knife edge bearings for longitudinal and angular movement. One bearing is stationary, and the other mounted on manually operated setting lever which can be operated to place the recording pin in different angular recording positions for recording lines on parallel tracks of the record carrier. The recording pin can be oscillated with a resilient arm to make a zig-zag beam-shaped recording.

13 Claims, 5 Drawing Figures

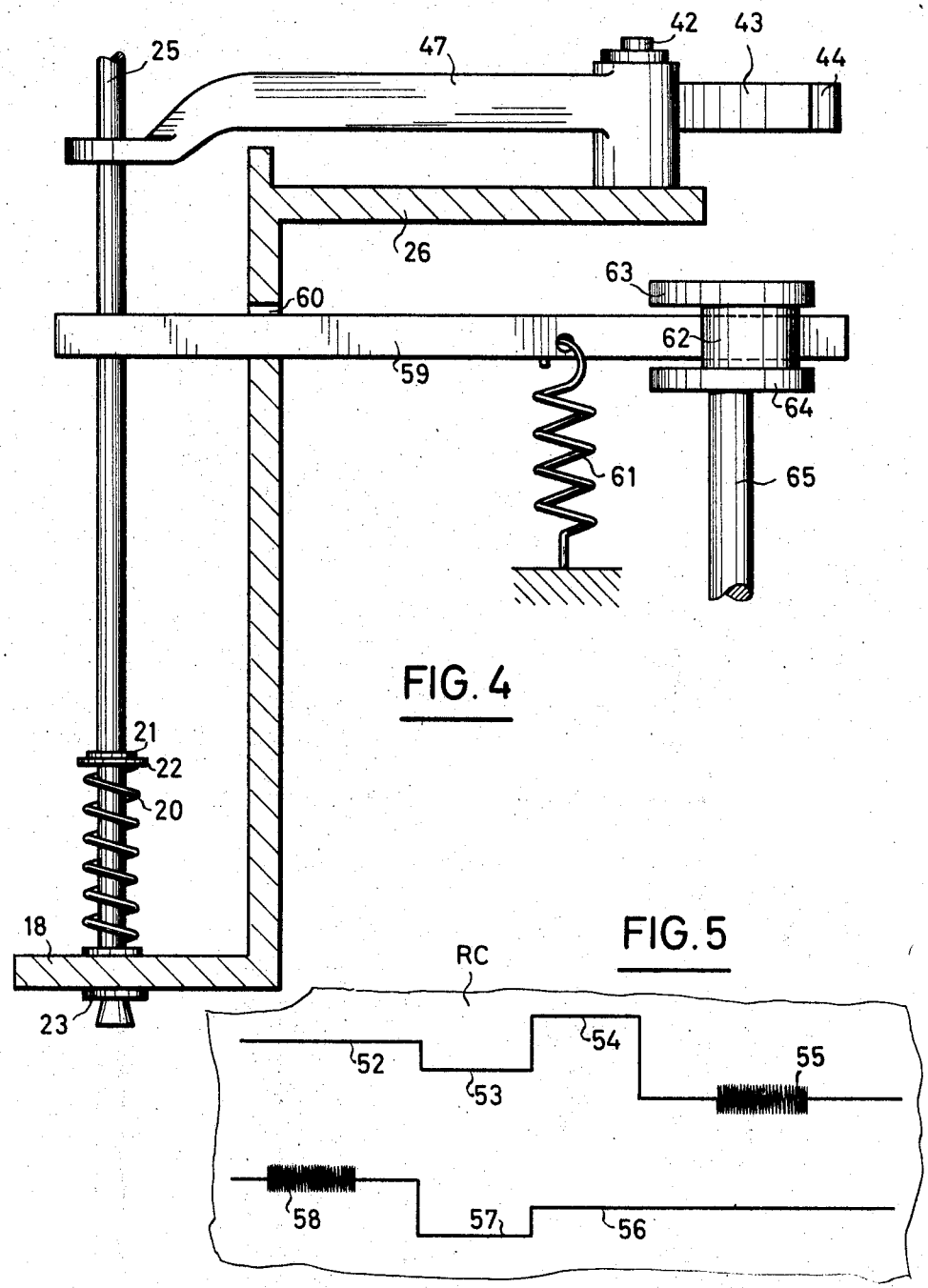

RECORDING APPARATUS FOR RECORDING ON A PLURALITY OF TRACKS

BACKGROUND OF THE INVENTION

The present invention relates to recording apparatus, particularly for recording speed, traveled distance, and variable operational conditions of a motor car.

In accordance with the prior art, a recording means is mounted on a tiltable one-armed recording lever. The recording lever is comparatively long, in order to make the angular displacement as small as possible due to friction, so that it must be mounted positioned across the apparatus, and takes up a great deal of space.

SUMMARY OF THE INVENTION

It is one object of the invention to improve known recording apparatus for motor cars and the like, to reduce the number of parts of the apparatus, and provide a more compact apparatus.

With these objects in view, the present invention provides a recording means which is mounted for angular movement in such a manner that first stationary mounting means support the recording means in the direction of the force applied to the record carrier, while a second mounting means for the recording means is supported on an operating lever for movement therewith to place the recording point on different tracks of the record carrier.

In a preferred embodiment of the invention, the recording means is a recording pin which is mounted in two mounting means for angular and longitudinal movement, and spring biased longitudinally toward the record carrier.

It is a particular advantage of the present invention that the force at which the recording pin abuts the record carrier is directly taken up by a stationary mounting means. The tilting moment produced by movement of the recording pin to different record carrier tracks is negligibly small due to the very small tilting angle. Furthermore, due to the mounting of the recording pin at the bottom of the housing, the space in the housing is better accessible than in the prior art using an additional recording lever. Aside from the fact that the recording lever of the prior art, and its supporting shaft is not required in the arrangement of the invention, so that the cost of manufacture and assembly is reduced, the available surface of the record carrier can be fully used since, if several recording pins are used, the recording points thereof can be placed very close to each other.

An embodiment of the invention comprises recording means, preferably an elongated pin, having one end pointed to record a line on a supported moving record carrier; first mounting means supporting the recording means for limited longitudinal and angular movement, and preferably including means for biasing the recording means toward the record carrier, and stop means limiting such movement; and setting means including second mounting means supporting the recording means for longitudinal movement, and for angular movement between a plurality of recording positions in which the recording point is disposed for recording on spaced tracks, respectively, on the record carrier.

The setting means are movable between a plurality of setting positions for moving the recording means between the recording positions. Preferably, the setting means include operating means, such as a lever having the second mounting means, and manually operated selector means for displacing the operating lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a sectional view illustrating a detail of the embodiment of FIG. 3; and FIG. 5 is a schematic fragmentary view illustrating recorded lines on the record carrier.

DESCRIPTION OF THE PREFERRED EMBODIMENTS

Figure 1:
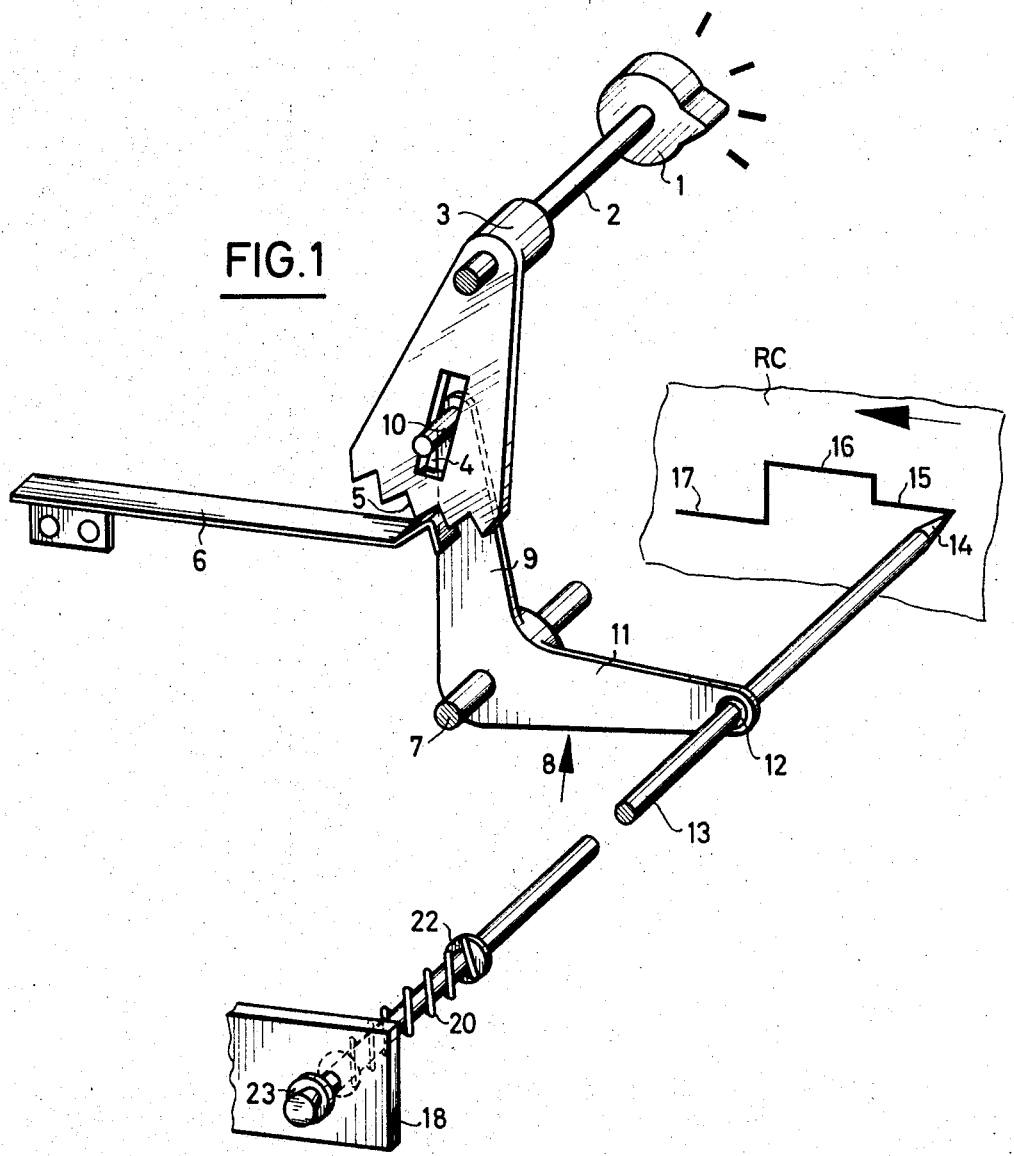
FIG. 1 is a fragmentary perspective view illustrating a first embodiment of the invention.
Figure 2:
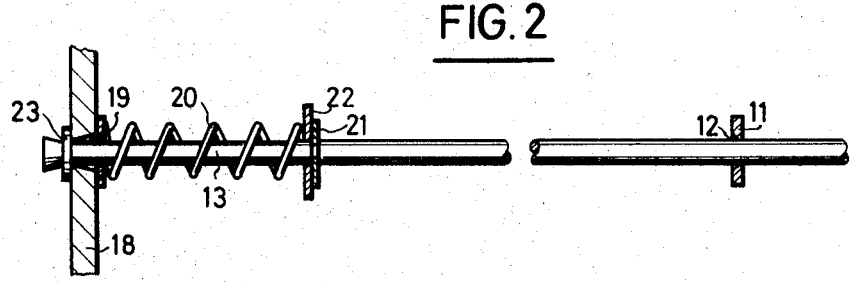
FIG. 2 is a side view illustrating a detail of the embodiment of FIG. 1.

Referring first to the embodiments of FIGS. 1 and 2, a manually operated turnable selector knob 1, located outside of the housing, not shown, is secured to a shaft 2 which fixedly carries a segment 3 with a rack 5. A leaf spring 6 forms a detent cooperating with the teeth of the rack 5 so that the knob 1 is resiliently arrested in different angular positions which correspond to space tracks 15, 16 and 17 on the record carrier RC, as will be explained hereinafter in greater detail.

An operating means 8, which together with the manual selector means 1 to 4 constitutes setting means for the recording pin 13, includes a lever mounted on a shaft 7 for turning movement and having one arm 9 provided with a pin 10 guided in slot 4, and the other arm 11 formed as a mounting means for the recording pin 13. As best seen in FIG. 2, the arm 11 is formed with an opening through which the recording pin 13 passes, and which has an inner annular knife edge permitting angular displacement of the recording pin 13.

The recording pin 13 is also mounted in a support wall which has an opening with an annular inner knife edge 19 through which the end of recording pin 13 passes so that the recording pin 13 is supported for angular movement when the operating lever 9, 11 is turned under the control of knob 1. A compression spring 20 surrounds the end of recording pin 13 and abuts the stationary wall 18 at one end, and a spring dish 22 secured by spring ring 21 on the other end. A spring ring 23 or other stop means is secured to the accordingly deformed end of recording pin 13 and abuts the outer surface of the stationary wall 18, so that movement of recording pin 13 toward the record carrier RC by the action of spring 20 is limited in the correct position. The knife edge 19 permits the angular displacement of the recording pin 13 caused by the movement of the operating means 8 so that in the four different positions of knob 1, the recording point 14 of the recording pin 13 can be placed in four different positions for recording different tracks, only three tracks 15, 16 and 17 on the record carrier RC being shown in FIG. 1. Recordings in different tracks may indicate different operational conditions of the motor car.

In the illustrated embodiment of FIG. 1, the recording pin 13 has four angularly displaced recording positions, and is shifted by setting means including the selector means 1 to 4 and the operating means 8 when the setting means are placed in four different setting positions which can be indicated by indicias around the selector knob 1.

Figure 3:
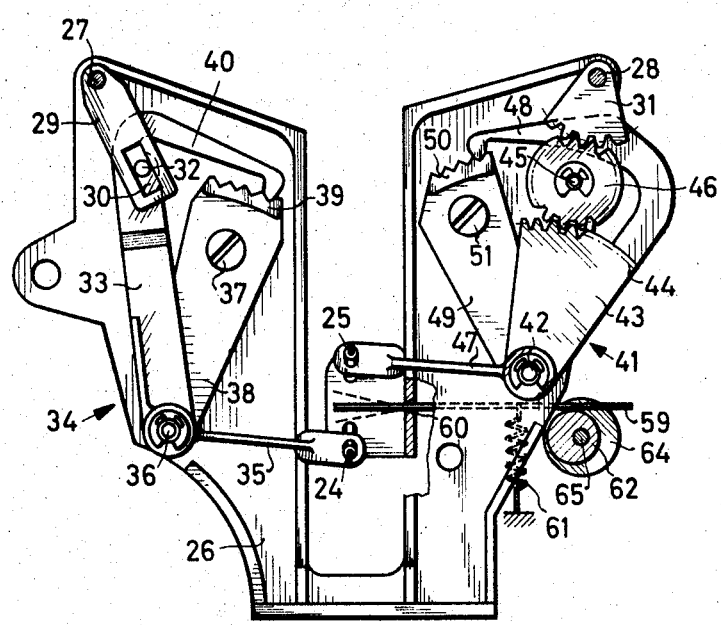
FIG. 3 is a side elevation illustrating another embodiment of the invention provided with two recording means.

The embodiment illustrated in FIG. 3 is used for a motor car, and have recording means in the form of recording pins 24 and 25, recording on the same record carrier in spaced tracks, and serving the purpose of recording the different work operations carried out by the driver and his assistant of the crew of a truck, each driver being associated with a separate recording, and the shifting of each recorded line between different trucks, as explained above, indicates, for example, waiting times, driving times, and loading times.

As shown in FIG. 3, the two recording pins 24 and 25, and the associated setting means are mounted on a supporting frame 26, forming a unit which can be inserted into a housing, not shown. As described with reference to FIG. 1, the setting of the recording pins 24 and 25 is effected by selector shafts 27, 27 carrying selector knobs, not shown, so that arm 29 with slot 30, and gear segment 31 and gear 46 can be independently turned. An angular operating lever with two arms 33, 35 is mounted for angular movement on a shaft 36, on which also a member 38 is mounted for angular movement, but is fixed after adjustment by a screw 37. Member 38 carries a rack 39 cooperating with a resilient detent portion 40 which is an extension of arm 33 of the operating lever 33, 35. Since arm 33 has a pin 32 in the slot 30, the operating lever 33, 35 can be adjusted between angular positions. The end of lever arm 35 has an annular knife edge, as shown at 12 in FIG. 2, through which the recording pin 4 passes whose end is mounted as shown at the left end of FIG. 2, and also as shown in FIG. 4 for recording pin 25.

When the knob, not shown, on selector shaft 28 is turned, gear segment 31 turns gear 46 about a shaft 45, and since gear 46 meshes with the gear segment portion 44 on the lever arm 43, 47 is the operating lever 43, 47 is turned about shaft 42 which corresponds to shaft 1 in FIG. 1, and to shaft 36 in FIG. 2. The arm 47 has an opening with a knife edge as shown at 12 in FIG. 2, and the end of recording pin 25 is mounted as shown in the bottom portion of FIG. 4, so that manual turning of the selector shaft 28 causes angular displacement of recording pin 25 so that its point moves to another track position.

The arresting means 40, 39, and the corresponding arresting means 48, 50, determine the precise angular positions of the setting means 34 and 41, and the corresponding recording positions of recording pins 24 and 25.

The embodiment of FIG. 3 permits it to place each of the two recording pins 24, 25, in the manner best shown in FIG. 1, between four different positions corresponding to four recording tracks on the record carrier, depending on which operational condition of the motor car, or which type of work of the drivers is to be recorded over the time. Evidently, fewer or more positions of each recording pin are possible provided that a certain angular displacement of each recording pin is not exceeded.

If is often desirable that one of the time periods recorded on the record carriers is particularly clearly visible. This may be obtained by recording in the respective track, when the respective condition occurs, instead of a line 52, 53, 54, a zig-zag recording 55 which appears as a broad beam-shaped recording 55. In the lower portion of FIG. 5, a recorded line 56, 57 made by the recording pin 24, is transformed into a zig-zag recording 58 forming a beam-shaped recording which is clearly visible.

For making a beam-shaped zig-zag recording 55 or 58, it is necessary to oscillate the recording pins 24 and 25 transverse to the direction in which the record carrier moves, and parallel to the surface of the record carrier RC.

In the embodiment of FIGS. 3 and 4, a rod 59 is provided which is angularly osciallated by an eccentric member 62 driven by drive shaft 65. As best seen in FIG. 4, lateral flanges 62 and 64 are provided on opposite sides of the rod 59 which passes through an opening 60 in the supporting frame 26. Upon rotation of the eccentric member 62, the rod 59 oscillates, and engages the central portions of the recording pins 24 and 25. The arms 35 and 47 of the respective operating levers are made thin and resilient so that the arms resiliently yield when rod 59 engages one or the other recording pin 24, 25, obtaining an oscillation of the respective recording points to form the zig-zag recordings 55 and 58. The spring 61 is provided for holding the rod 59 on the outer periphery of the eccentric cam 62.

The drive of shaft 65 of the eccentric member 62 will depend on the travelled distance, and be branched off the counter drive of the recording instrument, of the shaft 65 may be driven by an independent electromotor. It is also possible to oscillate the rod 59 by a vibrator directly secured to rod 59.

It is also possible to construct the rod 59 as the armature of an electromagnet excited by an electric oscillation generator.

It will be understood that each of the elements described above, or two or more together, may also find a useful application in other types of recording apparatus for recording on a plurality of tracks differing from the type described above.

While the invention has been illustrated and described as embodied in a recording apparatus in which a recording pin is supported for longitudinal and angular movement by knife edges, one of which is displaced by setting means, it is not intended to be limited to the details shown, since various modifications and structural changes may be made without departing in any from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Recording apparatus for recording on a plurality of tracks, comprising recording means having one end adapted to record a line on a supported moving record carrier;

first mounting means supporting said recording means for limited longitudinal and angular movement; and setting means including second mounting means supporting said recording means for longitudinal movement, and for angular movement between a plurality of recording positions in which said one end is disposed for recording on spaced tracks, respectively, on said record carrier, said setting means being movable between a plurality of setting positions for moving said recording means between said recording positions.

2. Recording apparatus as claimed in claim 1, including stationary supporting means on which said first mounting means is stationarily mounted.

3. Recording apparatus as claimed in claim 2, wherein said first stationary mounting means include biasing means for urging said recording means to move longitudinally toward said record carrier, and stop means for limiting longitudinal movement of said recording means toward said record carrier when said recording means is in said recording positions.

4. Recording apparatus as claimed in claim 3, wherein said setting means includes a shaft, and a lever mounted on said shaft for angular movement in a plane, and having on one end thereof said second mounting means; and wherein said recording means includes an elongated pin having a recording point at said one end.

5. Recording apparatus as claimed in claim 1, wherein said recording means includes an elongated pin having a recording point at said one end; and wherein said second mounting means includes an opening through which said pin passes, said opening having an inner knife edge for supporting said pin for angular movement.

6. Recording apparatus as claimed in claim 5, wherein said first mounting means include a stationary support wall having an other opening through which the other end of said pin passes; and wherein said other opening has an inner knife edge supporting said pin for angular movement.

7. Recording apparatus as claimed in claim 6, wherein both said inner knife edges are annular and guide said pin for longitudinal and angular movement.

8. Recording apparatus as claimed in claim 1, wherein said setting means include operating means having said second mounting means, and manually operated selector means connected with said operating means for manually moving the same between said setting positions.

9. Recording apparatus as claimed in claim 8, wherein said setting means include arresting means for resiliently arresting said manually operated selector means in a plurality of arrested positions in which said operating means is in said setting positions, respectively.

10. Recording apparatus as claimed in claim 9, wherein said operating means include a double armed lever having one arm with said second mounting means, and a shaft supporting said lever for angular movement; and wherein said arresting means include a stationary arresting rack, and an elastic detent on the other arm of said lever cooperating with said rack.

11. Recording apparatus as claimed in claim 10, wherein said rack is mounted on said shaft for angular adjustment; and wherein said arresting means include means for stationarily fixing said rack in an adjusted angular position.

12. Recording apparatus as claimed in claim 1, wherein said setting means includes a shaft, and a lever mounted on said shaft for angular movement between said setting positions, said lever having an arm carrying said second mounting means and being resilient in a plane perpendicular to said shaft and parallel to said record carrier; and further comprising means for oscillating said arm in said plane so that said recording means makes a beam-shaped zig-zag recording on said record carrier.

13. Recording apparatus as claimed in claim 12, wherein said means for oscillating include a biased rod cooperating with said recording means, and driven eccentric means for oscillating said rod and thereby said one end of said recording means and said arm.

* * * * *